United States Patent
Ge et al.

(10) Patent No.: US 9,546,591 B2
(45) Date of Patent: Jan. 17, 2017

(54) EXHAUST SYSTEM WITH EXHAUST GAS RECIRCULATION AND MULTIPLE TURBOCHARGERS, AND METHOD FOR OPERATING SAME

(71) Applicant: Caterpillar Inc., Peoria, IL (US)

(72) Inventors: Xinyu Ge, Peoria, IL (US); Hong Liang Liang, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 105 days.

(21) Appl. No.: 14/554,659

(22) Filed: Nov. 26, 2014

(65) Prior Publication Data

US 2016/0146097 A1 May 26, 2016

(51) Int. Cl.
*F02B 33/44* (2006.01)
*F02D 23/00* (2006.01)
(Continued)

(52) U.S. Cl.
CPC .............. *F02B 37/18* (2013.01); *F02B 37/013* (2013.01); *F02B 37/025* (2013.01); *F02M 26/08* (2016.02);
(Continued)

(58) Field of Classification Search
CPC ....... F02B 37/18; F02B 37/007; F02B 37/013; F02M 25/07; F02M 25/0707; F02M 25/071; F02M 25/0711; F02M 25/0773; F02M 25/0777; F02M 25/0772; F02M 25/0754; F02M 26/07; F02M 26/08; F02M 26/09; F02M 26/10; F02M 26/16; F02M 26/52; F02M 26/53; F02M 26/54; F02M 26/69; F02M 26/71; F02D 23/00; F02D 23/005; F02D 21/08; F01N 13/08; F01N 13/10; F01N 13/14; F01N 13/102; F01N 13/1811; F01N 13/1805; F01N 2240/20
(Continued)

(56) References Cited

U.S. PATENT DOCUMENTS

| 3,077,071 A | * | 2/1963 | Leichtfuss | ............... F02B 37/02 60/323 |
| 5,713,200 A | * | 2/1998 | Baets | ...................... F02B 37/02 60/323 |

(Continued)

FOREIGN PATENT DOCUMENTS

| CN | 101008336 A | * | 8/2007 | |
| DE | 3200521 C2 | * | 10/1992 | .............. F02B 37/02 |

(Continued)

*Primary Examiner* — Thai Ba Trieu
(74) *Attorney, Agent, or Firm* — Hibshman Claim Contruction PLLC (57) ABSTRACT

An exhaust system includes a first turbine having an inlet that is fluidly coupled to an exhaust conduit; a valve assembly having an inlet port, a first outlet port, and a second outlet port, the inlet port of the valve assembly being in fluid communication with the exhaust conduit; a second turbine having an inlet that is fluidly coupled to the first outlet port of the valve assembly via a first outlet port conduit, and fluidly coupled to an outlet of the first turbine via a first turbine outlet conduit; and a controller operatively coupled to the valve assembly. The valve assembly has a first configuration that blocks fluid communication between the inlet port and the first outlet port, and the valve assembly has a second configuration that effects fluid communication between the inlet port and the first outlet port.

20 Claims, 6 Drawing Sheets

(51) Int. Cl.
*F01N 1/00* (2006.01)
*F02M 25/07* (2006.01)
*F02B 33/00* (2006.01)
*F02B 37/18* (2006.01)
*F02B 37/013* (2006.01)
*F02B 37/02* (2006.01)
*F02B 27/04* (2006.01)
*F02D 41/10* (2006.01)
*F02D 41/00* (2006.01)

(52) U.S. Cl.
CPC ............ *F02B 27/04* (2013.01); *F02D 41/0007* (2013.01); *F02D 41/10* (2013.01); *F02D 2200/101* (2013.01)

(58) Field of Classification Search
USPC ........ 60/602, 612, 605.2, 322–324; 123/562, 123/568.23, 568.24, 568.26, 568.29; 701/108
See application file for complete search history.

(56) References Cited

U.S. PATENT DOCUMENTS

| | | | |
|---|---|---|---|
| 6,321,537 B1 | 11/2001 | Coleman et al. | |
| 6,981,375 B2* | 1/2006 | Sisken | F02M 25/0711 60/605.2 |
| 7,165,403 B2 | 1/2007 | Sun et al. | |
| 7,490,462 B2* | 2/2009 | Roozenboom | F02M 25/0711 60/605.2 |
| 7,571,608 B2* | 8/2009 | Boyapati | F02M 25/0711 60/605.2 |
| 7,861,580 B2 | 1/2011 | Sujan et al. | |
| 8,047,184 B2 | 11/2011 | Styles et al. | |
| 8,161,747 B2 | 4/2012 | Pierpont et al. | |
| 8,297,053 B2 | 10/2012 | Gladden et al. | |
| 8,495,992 B2* | 7/2013 | Roth | F02M 25/071 123/568.12 |
| 2006/0123787 A1 | 6/2006 | Gobert et al. | |
| 2006/0174621 A1 | 8/2006 | Chen et al. | |
| 2007/0062190 A1* | 3/2007 | Melchior | F02B 37/013 60/612 |
| 2009/0249786 A1* | 10/2009 | Garrett | F02B 37/013 60/612 |
| 2011/0000208 A1* | 1/2011 | Robinson | F02B 37/013 60/602 |
| 2012/0325187 A1 | 12/2012 | Sankar et al. | |
| 2013/0131953 A1 | 5/2013 | Luft et al. | |
| 2013/0298525 A1* | 11/2013 | Lim | F02M 25/071 60/273 |
| 2014/0026565 A1 | 1/2014 | Peters et al. | |
| 2015/0337717 A1* | 11/2015 | Robinson | F02B 37/013 60/602 |

FOREIGN PATENT DOCUMENTS

| | | | | |
|---|---|---|---|---|
| DE | 19514572 A1 | * | 10/1996 | ............ F02B 37/013 |
| DE | 10222919 A1 | * | 12/2003 | ............ F02B 37/013 |
| FR | EP 1375893 A1 | * | 1/2004 | ............ F02M 25/071 |
| GB | 2492994 A | * | 1/2013 | .......... F02M 25/0711 |
| JP | 2007100627 A | * | 4/2007 | ............ F02B 37/013 |
| WO | 2013/032427 A1 | | 3/2013 | |

* cited by examiner

EXHAUST SYSTEM WITH EXHAUST GAS RECIRCULATION AND MULTIPLE TURBOCHARGERS, AND METHOD FOR OPERATING SAME

TECHNICAL FIELD

This patent disclosure relates generally to engine exhaust systems and, more particularly, to exhaust gas recirculation systems including more than one turbocharger.

BACKGROUND

Reciprocating internal combustion (IC) engines are known for converting chemical energy stored in a fuel supply into mechanical shaft power. A fuel-oxidizer mixture is received in a variable volume of an IC engine defined by a piston translating within a cylinder bore. The fuel-oxidizer mixture burns inside the variable volume to convert chemical energy from the mixture into heat. In turn, expansion of the combustion products within the variable volume performs work on the piston, which may be transferred to an output shaft of the IC engine.

Variations in the temperature and the chemical composition of an oxidizer stream entering an engine are known to affect engine performance. For example, exhaust gas recirculation (EGR) may be used to modify the temperature of an oxidizer stream, a chemical composition of an oxidizer stream, or combinations thereof, by combining a portion of exhaust gas with an oxidizer stream entering an engine Further, variations in the pressure of an oxidizer stream entering an engine are also known to affect engine performance. As a result, some engine systems employ turbochargers or superchargers to increase the pressure of the oxidizer stream entering the engine. Some conventional approaches to turbocharging may include more than one turbocharger.

U.S. Pat. No. 7,165,403 ("the '403 patent"), entitled "Series/Parallel Turbochargers and Switchable High/Low Pressure EGR for Internal Combustion Engines," purports to address the problem of turbocharger sizing and inertial lag or delay. The '403 patent describes systems and methods for turbocharging and providing exhaust gas recirculation for internal combustion engines.

The engine system of the '403 patent includes a first turbocharger associated with a first bank of engine cylinders and a second turbocharger fluidly coupled to the first turbocharger. The first turbocharger preferably has a variable geometry, such as a variable turbine inlet nozzle, to improve efficiency and boost for low mass flow operating regions while maintaining high mass flow capacity at higher engine speeds. Further, exhaust system valving in the '403 patent may be actuated to operate the first turbocharger and the second turbocharger in series operation or parallel operation, where the outlet of the first turbine is blocked from fluid communication with the inlet to the second turbine during parallel operation.

However, the variable geometry turbochargers recommended by the '403 patent may be unduly expensive, complex, physically large, or combinations thereof. Further, the series and parallel operation of the two turbochargers may not optimize all desired engine operating conditions. Accordingly, there is a need for improved exhaust systems to address the aforementioned problems, other problems in the art, or combinations thereof.

SUMMARY

According to an aspect of the disclosure, an exhaust system comprises an exhaust conduit configured to receive a flow of exhaust gas from an internal combustion engine; a first turbine having an inlet that is fluidly coupled to the exhaust conduit; a first compressor operatively coupled to the first turbine via a first shaft; a valve assembly having an inlet port, a first outlet port, and a second outlet port, the inlet port of the valve assembly being in fluid communication with the exhaust conduit via an exhaust bypass conduit; a second turbine having an inlet that is fluidly coupled to the first outlet port of the valve assembly via a first outlet port conduit, and fluidly coupled to an outlet of the first turbine via a first turbine outlet conduit, the first turbine outlet conduit being distinct from the first outlet port conduit; and a controller operatively coupled to the valve assembly. The valve assembly has a first configuration that blocks fluid communication between the inlet port and the first outlet port, and the valve assembly has a second configuration that effects fluid communication between the inlet port and the first outlet port. The controller is configured to effect simultaneous fluid communication between the inlet of the second turbine and the outlet of the first turbine via the first turbine outlet conduit, and between the inlet of the second turbine and the first outlet port of the valve assembly via the first outlet port conduit, by actuating the valve assembly to the second configuration.

According to another aspect of the disclosure, an internal combustion engine comprises a plurality of engine cylinders, each engine cylinder including piston configured to reciprocate therein; an intake manifold fluidly coupled to the plurality of engine cylinders via a plurality of intake valves; an exhaust manifold fluidly coupled to the plurality of engine cylinders via a plurality of exhaust valves; a first turbine having an inlet that is fluidly coupled to the exhaust manifold; a first compressor operatively coupled to the first turbine, an outlet of the first compressor being fluidly coupled to the intake manifold; a valve assembly having an inlet port, a first outlet port, and a second outlet port, the inlet port of the valve assembly being in fluid communication with the exhaust conduit via an exhaust bypass conduit; a second turbine having an inlet that is fluidly coupled to the first outlet port of the valve assembly via a first outlet port conduit, and fluidly coupled to an outlet of the first turbine via a first turbine outlet conduit, the first turbine outlet conduit being distinct from the first outlet port conduit; and a controller operatively coupled to the valve assembly. The valve assembly has a first configuration that blocks fluid communication between the inlet port and the first outlet port, and the valve assembly has a second configuration that effects fluid communication between the inlet port and the first outlet port. The controller is configured to effect simultaneous fluid communication between the inlet of the second turbine and the outlet of the first turbine via the first turbine outlet conduit, and between the inlet of the second turbine and the first outlet port of the valve assembly via the first outlet port conduit, by actuating the valve assembly to the second configuration.

Another aspect of the disclosure provides a method for operating an internal combustion engine, comprising receiving a flow of exhaust in an exhaust conduit; selectively splitting the flow of exhaust into a first exhaust flow and a second exhaust flow, and directing the first exhaust flow through a first turbine; and combining the first exhaust flow and at least a portion of the second exhaust flow downstream of the first turbine into a third exhaust flow, and directing the third exhaust flow through a second turbine.

DETAILED DESCRIPTION

Aspects of the disclosure will now be described in detail with reference to the drawings, wherein like reference numbers refer to like elements throughout, unless specified otherwise.

Figure 1:
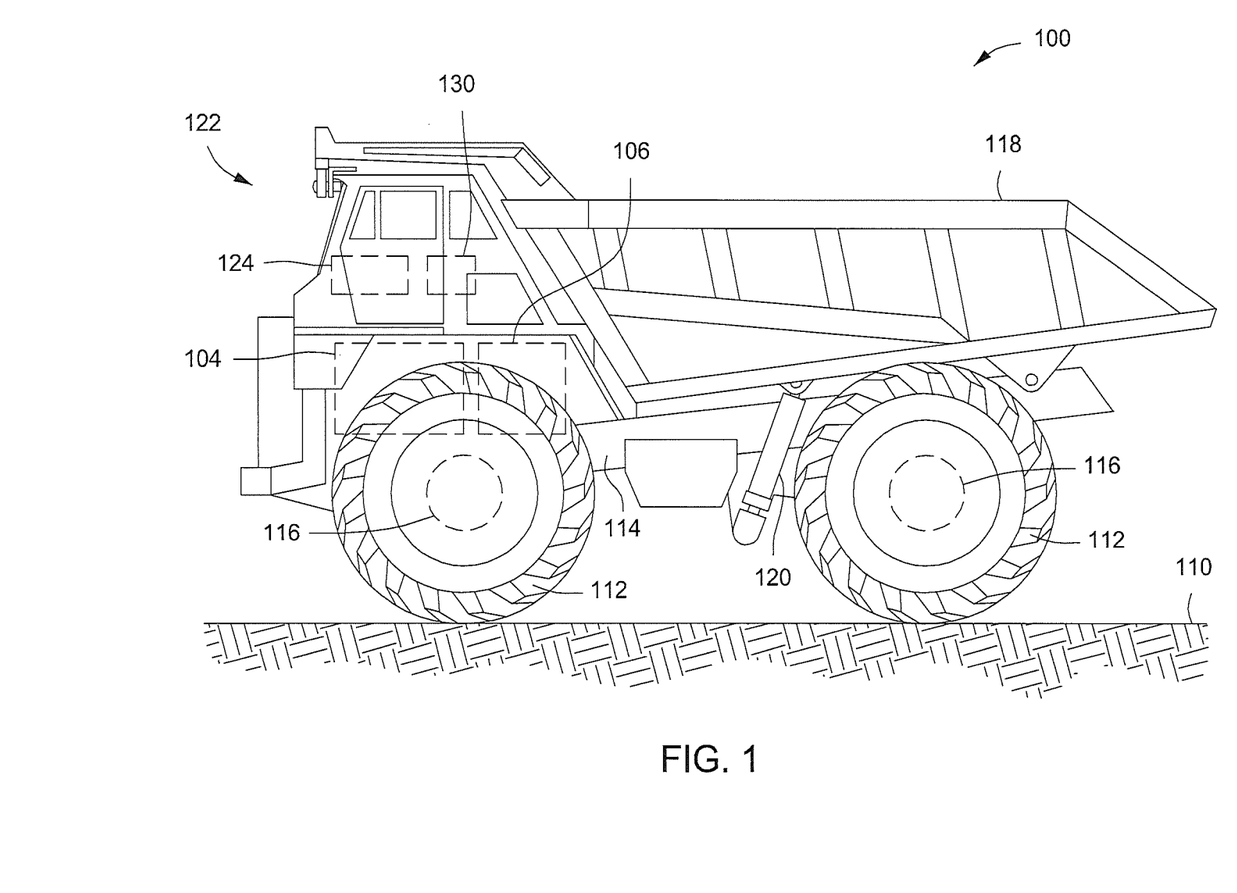
FIG. 1 shows a side view of a machine, according to an aspect of the disclosure.

FIG. 1 shows a side view of a machine 100, according to an aspect of the disclosure. The machine 100 includes an internal combustion (IC) engine 104 that is fluidly coupled to an exhaust system 106. The IC engine 104 maybe a reciprocating internal combustion engine, such as a compression ignition engine or a spark ignition engine, for example, or a rotating internal combustion engine, such as a gas turbine, for example.

The machine 100 may be propelled over a work surface 110 by wheels 112 coupled to a chassis 114. The wheels 112 may be driven by motors 116, a mechanical transmission coupled to the IC engine 104, or combinations thereof. It will be appreciated that the machine 100 could also be propelled by tracks (not shown), combinations of wheels 112 and tracks, or any other surface propulsion device known in the art. Alternatively, the machine 100 could be a stationary machine, and therefore may not include a propulsion device.

The machine 100 may also include a work implement 118 driven by an actuator 120. The work implement 118 could be a dump bed, a shovel, a drill, a fork lift, a feller-buncher, a conveyor, or any other implement known in the art for performing work on a load. The actuator 120 may be a hydraulic actuator, such as a linear hydraulic motor or a rotary hydraulic motor, an electric motor, a pneumatic actuator, or any other actuator known in the art.

The machine may include a cab 122 configured to accommodate an operator, and have a user interface 124 including using input devices for asserting control over the machine 100. The user interface 124 may include pedals, wheels, joysticks, buttons, touch screens, combinations thereof, or any other user input device known in the art. Alternatively or additionally, the user interface 124 may include provisions for receiving control inputs remotely from the cab 122, including wired or wireless telemetry, for example. The IC engine 104, the exhaust system 106, and the user interface 124 may be operatively coupled to one another via a controller 130.

The machine can be an "over-the-road" vehicle such as a truck used in transportation or may be any other type of machine that performs some type of operation associated with an industry such as mining, construction, farming, transportation, or any other industry known in the art. For example, the machine may be an off-highway truck; an earth-moving machine, such as a wheel loader, an excavator, a dump truck, a backhoe, a motor grader, or a material handler; a marine vehicle or machine, or another machine known in the art. The term "machine" can also refer to stationary equipment, such as a generator that is driven by an internal combustion engine to generate electricity. The specific machine 100 illustrated in FIG. 1 is a dump truck having a dump bed 118 that is actuated by the actuator 120, where the actuator 120 is a linear hydraulic cylinder.

Figure 2:
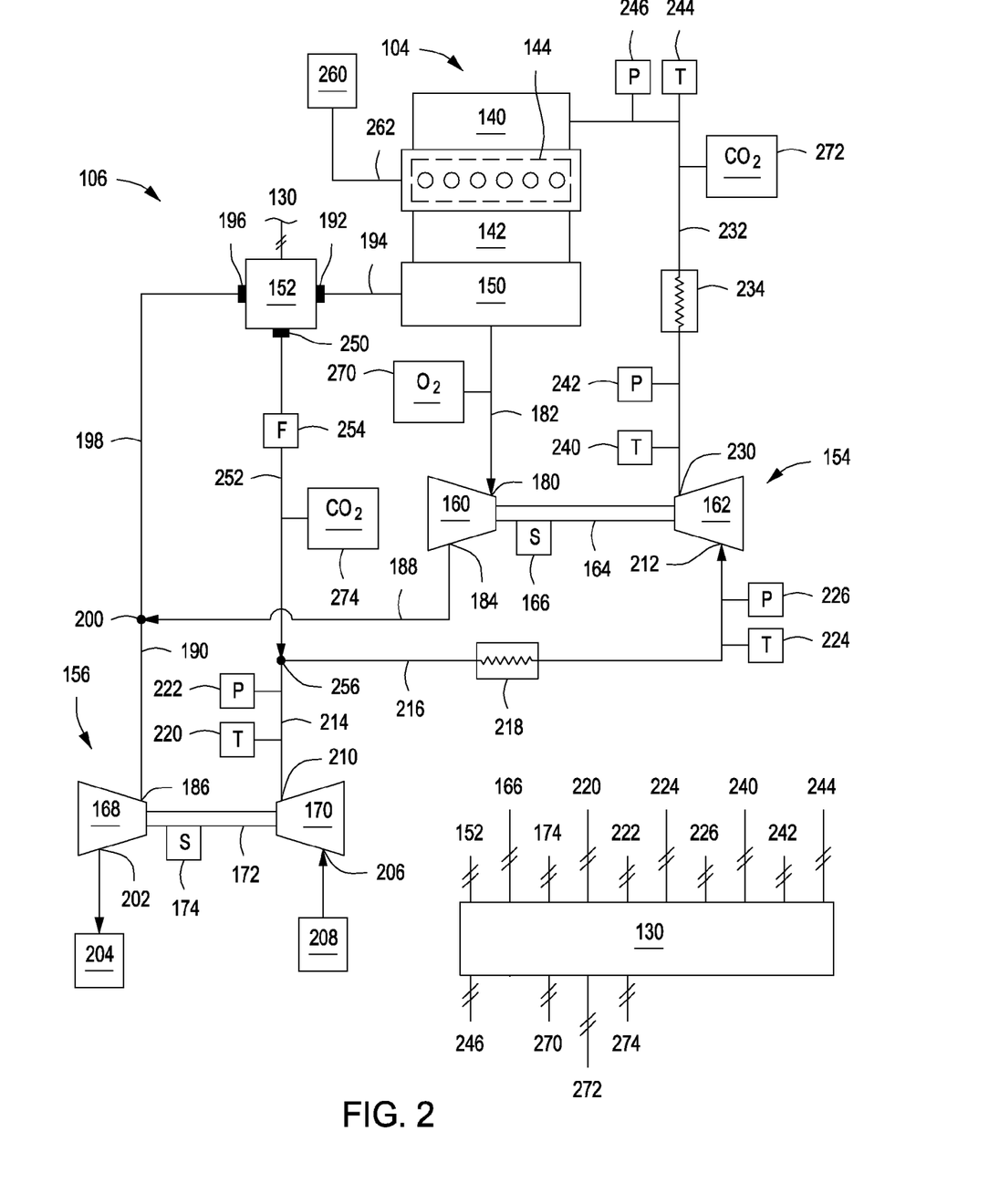
FIG. 2 is a schematic view of an exhaust system for an internal combustion engine, according to an aspect of the disclosure.

FIG. 2 is a schematic view of an exhaust system 106 for an IC engine 104, according to an aspect of the disclosure. The IC engine 104 includes an intake manifold 140 and an exhaust manifold 142, each being in selective fluid communication with a plurality of engine cylinders 144 via an engine valve assembly. Each cylinder of the plurality of engine cylinders 144 may contain a piston configured for reciprocating motion therein, where any of the engine cylinders and a corresponding piston may at least partly define a combustion chamber.

The exhaust system 106 includes an exhaust conduit 150, an exhaust valve module 152, a high-pressure turbocharger 154, and a low-pressure turbocharger 156. The exhaust valve module 152 may be an exhaust valve assembly. The high-pressure turbocharger 154 includes a high-pressure turbine 160 operatively coupled to a high-pressure compressor 162 via a shaft 164. A speed sensor 166 may be operatively to the high-pressure turbine 160, the high-pressure compressor 162, the shaft 164, or combinations thereof, for sensing a rotational speed of the high-pressure turbocharger 154. The speed sensor 166 may be operatively coupled to the controller 130 for transmitting a signal indicative of the rotational speed of the high-pressure turbocharger 154.

The low-pressure turbocharger 156 includes a low-pressure turbine 168 operatively coupled to a low-pressure compressor 170 via a shaft 172. A speed sensor 174 may be operatively to the low-pressure turbine 168, the low-pressure compressor 170, the shaft 172, or combinations thereof, for sensing a rotational speed of the low-pressure turbocharger 156. The speed sensor 174 may be operatively coupled to the controller 130 for transmitting a signal indicative of the rotational speed of the low-pressure turbocharger 156.

According to an aspect of the disclosure, there is no shaft power coupling between the high-pressure turbocharger 154 and the low-pressure turbocharger 156, such that the shaft 164 is separate and distinct from the shaft 172. According to another aspect of the disclosure, the high-pressure turbine 160, the low-pressure turbine 168, or both, do not include variable inlet flow geometry, such as variable inlet guide vanes.

The exhaust conduit 150 is fluidly coupled to the exhaust manifold 142 of the IC engine 104. According to an aspect of the disclosure, the exhaust conduit 150 receives the confluence of individual exhaust runner conduits of the exhaust manifold 142, where each of the individual exhaust runner conduits are paired with an engine cylinder 144. According to another aspect of the disclosure, the exhaust manifold 142 combines the flow paths of two or more exhaust runner conduits, and the exhaust conduit 150 receives the combined exhaust flow paths. According to yet another aspect of the disclosure, the exhaust manifold 143 includes individual exhaust runner conduits from the individual cylinders, and effects fluid communication between the individual exhaust runner conduits and the exhaust conduit 150 without combining any of the individual exhaust runner conduits upstream of the exhaust conduit 150. According to another aspect of the disclosure, the exhaust conduit 150 is an exhaust pulse converter that is configured to convert kinetic energy from individual exhaust pulses from individual engine cylinders 144 into static pressure within the exhaust pulse converter.

The exhaust conduit 150 is fluidly coupled to the inlet 180 of the high-pressure turbine 160 via a high-pressure turbine inlet conduit 182. An outlet 184 of the high-pressure turbine 160 is fluidly coupled to an inlet 186 of the low-pressure turbine 168 via a high-pressure turbine outlet conduit 188 and a low-pressure turbine inlet conduit 190.

The exhaust conduit 150 is also fluidly coupled to an inlet port 192 of the exhaust valve module 152 via an exhaust bypass conduit 194. A first outlet port 196 of the exhaust valve module 152 is fluidly coupled to the inlet 186 of the low-pressure turbine 168 via a first exhaust valve module outlet conduit 198 and the low-pressure turbine inlet conduit 190.

A downstream end of the high-pressure turbine outlet conduit 188 and a downstream end of the first exhaust valve module outlet conduit 198 are in fluid communication at a node 200, such that flows through the high-pressure turbine outlet conduit 188 and the first exhaust valve module outlet conduit 198 combine at the inlet to the low-pressure turbine inlet conduit 190. Accordingly, flow paths through the exhaust valve module 152 and the high-pressure turbine 160 are in a parallel flow arrangement before combining at the node 200. It will be appreciated that flow paths may be arranged fluidly in parallel without having structural portions of flow paths being geometrically parallel.

An outlet 202 of the low-pressure turbine may be fluidly coupled to one or more exhaust aftertreatment modules 204. The one or more exhaust aftertreatment modules 204 may be configured for trapping exhaust constituents, converting an exhaust constituent from one composition to another composition, or both. The one or more exhaust aftertreatment modules 204 may include a particulate filter, a nitrogen oxides (NOx) conversion module, an oxidation catalyst, combinations thereof, or any other exhaust aftertreatment device known in the art. According to an aspect of the disclosure, the exhaust system 106 does not include a particulate filter.

An inlet 206 of the low-pressure compressor 170 is in fluid communication with an oxidizer source 208 for the engine 104. The oxidizer source 208 may be an ambient environment for the machine 100 or the engine 104, another compressor, an oxidizer storage reservoir, combinations thereof, or any other oxidizer source known in the art.

An outlet 210 of the low-pressure compressor 170 is fluidly coupled to an inlet 212 of the high-pressure compressor 162 via a low-pressure compressor outlet conduit 214 and a high-pressure compressor inlet conduit 216. The high-pressure compressor inlet conduit 216 may include a heat exchanger 218 configured to extract heat from or add heat to a flow through the high-pressure compressor inlet conduit 216.

The exhaust system 106 may include a temperature sensor 220, a pressure sensor 222, or combinations thereof, operatively coupled to the low-pressure compressor outlet conduit 214 or the high-pressure compressor inlet conduit 216, upstream of the heat exchanger 218. Further, the exhaust system 106 may include a temperature sensor 224, a pressure sensor 226, or combinations thereof, operatively coupled to the high-pressure compressor inlet conduit 216, downstream of the heat exchanger 218. The temperature sensor 220, the pressure sensor 222, the temperature sensor 224, the pressure sensor 226, or combinations thereof may be operatively coupled to the controller 130 and configured to transmit a signal to the controller 130 indicative of a state of a flow at the corresponding sensor location.

An outlet 230 of the high-pressure compressor 162 is fluidly coupled to the intake manifold 140 via a high-pressure compressor outlet conduit 232. The high-pressure compressor outlet conduit 232 may include a heat exchanger 234 configured to extract heat from or add heat to a flow through the high-pressure compressor outlet conduit 232.

The exhaust system 106 may include a temperature sensor 240, a pressure sensor 242, or combinations thereof, operatively coupled to the high-pressure compressor outlet conduit 232, upstream of the heat exchanger 234. Further, the exhaust system 106 may include a temperature sensor 244, a pressure sensor 246, or combinations thereof, operatively coupled to the high-pressure compressor outlet conduit 232, downstream of the heat exchanger 234. The temperature sensor 240, the pressure sensor 242, the temperature sensor 244, the pressure sensor 246, or combinations thereof may be operatively coupled to the controller 130 and configured to transmit a signal to the controller 130 indicative of a state of a flow at the corresponding sensor location.

A second outlet port 250 of the exhaust valve module 152 is in fluid communication with the low-pressure compressor outlet conduit 214 and the high-pressure compressor inlet conduit 216 at a node 256 via an EGR conduit 252. Accordingly, flows through the EGR conduit 252 and the low-pressure compressor outlet conduit 214 may combine at the node 256 before entering the high-pressure compressor inlet conduit 216.

The EGR conduit 252 may include a flow meter 254 configured to measure a flow of fluid through the EGR conduit 252. The flow meter 254 may include a calibrated venturi, a calibrated orifice plate, a paddle-wheel, a Pitot probe, a hotwire probe, combinations thereof, or any other flow meter known in the art for measuring a flow of exhaust.

The exhaust valve module 152 may be configured to effect different states of fluid communication between the inlet port 192 and the first outlet port 196 and the second outlet port 250, as next discussed. In a first configuration, the exhaust valve module 152 blocks fluid communication between the inlet port 192 and the first outlet port 196, and blocks fluid communication between the inlet port 192 and the second outlet port 250. Accordingly, when the controller 130 actuates the exhaust valve module 152 to its first configuration, the exhaust conduit 150 is not in fluid communication with either the low-pressure turbine 168 or the low-pressure compressor outlet conduit 214 via the exhaust valve module 152. Further, it will be appreciated that when the controller 130 actuates the exhaust valve module 152 to its first configuration, all or substantially all of the exhaust flowing through the high-pressure turbine 160 may also flow through the low-pressure turbine 168.

In a second configuration, the exhaust valve module 152 effects fluid communication between the inlet port 192 and the first outlet port 196, and blocks fluid communication between the inlet port 192 and the second outlet port 250. Accordingly, when the controller 130 actuates the exhaust valve module 152 to its second configuration, the exhaust conduit 150 is in fluid communication with the low-pressure turbine 168 via the exhaust bypass conduit 194, but not in fluid communication with the low-pressure compressor outlet conduit 214. In turn, at least a portion of exhaust flow from the exhaust conduit 150 bypasses the high-pressure turbine 160 to recombine with outlet flow from the high-pressure turbine 160, if any, at the node 200 before flowing through the low-pressure turbine 168. Further according to the second configuration of the exhaust valve module 152, no EGR flows from the exhaust conduit 150 to the intake manifold 140 via the high-pressure compressor 162.

According to an aspect of the disclosure, fluid communication between the inlet port 192 and the first outlet port 196 of the exhaust valve module 152 may be toggled directly between a fully closed condition and a fully open or wide-open condition. According to another aspect of the disclosure, the exhaust valve module 152 may effect proportional control of the flow resistance, or effective flow area, between the inlet port 192 and the first outlet port 196, thereby enabling a continuous spectrum or a substantially continuous spectrum of flow resistances between a fully closed condition and a fully open or wide-open condition. It will be appreciated that the controller 130 may be configured to effect toggled operation or proportional operation of the flowpath resistance between the inlet port 192 and the first outlet port 196 of the exhaust valve module 152.

According to an aspect of the disclosure, a wide-open flow resistance of the flowpath between the inlet port 192 and the first outlet port 196 of the exhaust valve module 152 is sufficiently small to bypass substantially all exhaust flow away from the high-pressure turbine 160 and through the low-pressure turbine 168 via the first outlet port 196. According to another aspect of the disclosure, a wide-open flow resistance of the flowpath between the inlet port 192 and the first outlet port 196 of the exhaust valve module 152 is sufficiently small to bypass at least 95% of exhaust flow away from the high-pressure turbine 160 and through the low-pressure turbine 168 via the first outlet port 196. According to another aspect of the disclosure, a wide-open flow resistance of the flowpath between the inlet port 192 and the first outlet port 196 of the exhaust valve module 152 is less than 20% of a combined flow resistance through the exhaust bypass conduit 194, the exhaust valve module 152, the first exhaust valve module outlet conduit 198, and the low-pressure turbine inlet conduit 190.

In a third configuration, the exhaust valve module 152 blocks fluid communication between the inlet port 192 and the first outlet port 196, and effects fluid communication between the inlet port 192 and the second outlet port 250. Accordingly, when the controller 130 actuates the exhaust valve module 152 to its third configuration, the exhaust conduit 150 is in fluid communication with the low-pressure compressor outlet conduit 214, but blocked from fluid communication with the low-pressure turbine 168 via the exhaust valve module 152. In turn, at least a portion of exhaust flow through the exhaust conduit 150 is directed to the low-pressure compressor outlet conduit 214 as an EGR flow, but none of the exhaust flow through the exhaust conduit 150 bypasses the high-pressure turbine 160 via the exhaust valve module 152.

According to an aspect of the disclosure, fluid communication between the inlet port 192 and the second outlet port 250 of the exhaust valve module 152 may be toggled directly between a fully closed condition and a fully open or wide-open condition. According to another aspect of the disclosure, the exhaust valve module 152 may effect proportional control of the flow resistance, or effective flow area, between the inlet port 192 and the second outlet port 250, thereby enabling a continuous spectrum or a substantially continuous spectrum of flow resistances between a fully closed condition and a fully open or wide-open condition. It will be appreciated that the controller 130 may be configured to effect toggled operation or proportional operation of the flowpath resistance between the inlet port 192 and the second outlet port 250 of the exhaust valve module 152.

In a fourth configuration, the exhaust valve module 152 effects fluid communication between the inlet port 192 and the first outlet port 196, and effects fluid communication between the inlet port 192 and the second outlet port 250. Accordingly, when the controller 130 actuates the exhaust valve module 152 to its fourth configuration, the exhaust conduit 150 is in fluid communication with the low-pressure compressor outlet conduit 214 and the low-pressure turbine 168 via the exhaust valve module 152. In turn, at least a portion of exhaust flow through the exhaust conduit 150 is directed to the low-pressure compressor outlet conduit 214 as an EGR flow, and at least a portion the exhaust flow through the exhaust conduit 150 bypasses the high-pressure turbine 160 via the exhaust valve module 152.

The exhaust valve module 152 may effect toggled control of flow resistance between the inlet port 192 and the first outlet port 196, between the inlet port 192 and the second outlet port 250, or both. Further, the exhaust valve module 152 may effect proportional control of flow resistance between the inlet port 192 and the first outlet port 196, between the inlet port 192 and the second outlet port 250, or both. Moreover, the exhaust valve module 152 may effect any combination of toggled control or proportional control of flow resistance between the inlet port 192 and the first outlet port 196, and between the inlet port 192 and the second outlet port 250. It will be appreciated that controller 130 may cause the exhaust valve module 152 to effect flow resistance adjustments according to any of the aforementioned control strategies.

The IC engine 104 receives fuel from a fuel supply 260 via a fuel supply conduit 262. According to an aspect of the disclosure, the fuel supply 260 is a liquid fuel supply that delivers a liquid fuel to one or more of the engine cylinders 144. The liquid fuel may include distillate diesel, biodiesel, dimethyl ether, ethanol, methanol, seed oils, liquefied natural gas (LNG), liquefied petroleum gas (LPG), Fischer-Tropsch derived fuel, combinations thereof, or any other combustible liquid known in the art.

According to another aspect of the disclosure, the fuel supply 260 is a gaseous fuel supply that delivers a gaseous fuel to one or more of the engine cylinders 144. The gaseous fuel may include natural gas, methane, propane, hydrogen, biogas, syngas, combinations thereof, or any other combustible gas known in the art. According to another aspect of the disclosure, the gaseous fuel is natural gas. According to yet another aspect of the disclosure, the gaseous fuel is a combustible gas comprising at least 50% methane by mole. Further it will be appreciated that the fuel supply 260 may provide combinations of any of the aforementioned gaseous or liquid fuels to the IC engine 104.

The exhaust system 106 may include an oxygen sensor 270 disposed in fluid communication with the high-pressure turbine inlet conduit 182, or any other exhaust flowpath between the engine 104 and the high-pressure turbine 160 along an exhaust flow direction. The oxygen sensor may be operatively coupled to the controller 130 to transmit a signal indicative of an oxygen concentration at the location of the oxygen sensor 270.

The exhaust system 106 may include a carbon dioxide sensor 272 in fluid communication with the high-pressure compressor outlet conduit 232, or any other intake flowpath between the node 256 and the intake manifold 140, inclusive. Alternatively or additionally, the exhaust system 106 may include a carbon dioxide sensor 274 disposed along the EGR conduit 252. The carbon dioxide sensor 272, the carbon dioxide sensor 274, or both, may be operatively coupled to the controller 130 to transmit signals indicative of a carbon dioxide concentration at the location of the corresponding carbon dioxide sensor 272, 274. In turn, the controller 130 may be configured to calculate a mass fraction, a mole fraction, or both, of EGR mixed with the oxidizer entering the engine 104 based at least in part on a signal from the carbon dioxide sensor 272, the carbon dioxide sensor 274, or both. The EGR fraction calculations may be based on conservation of mass and conservation of chemical species for the oxidizer flow and the EGR flow, as will be appreciated by those having skill in the art.

Figure 3:
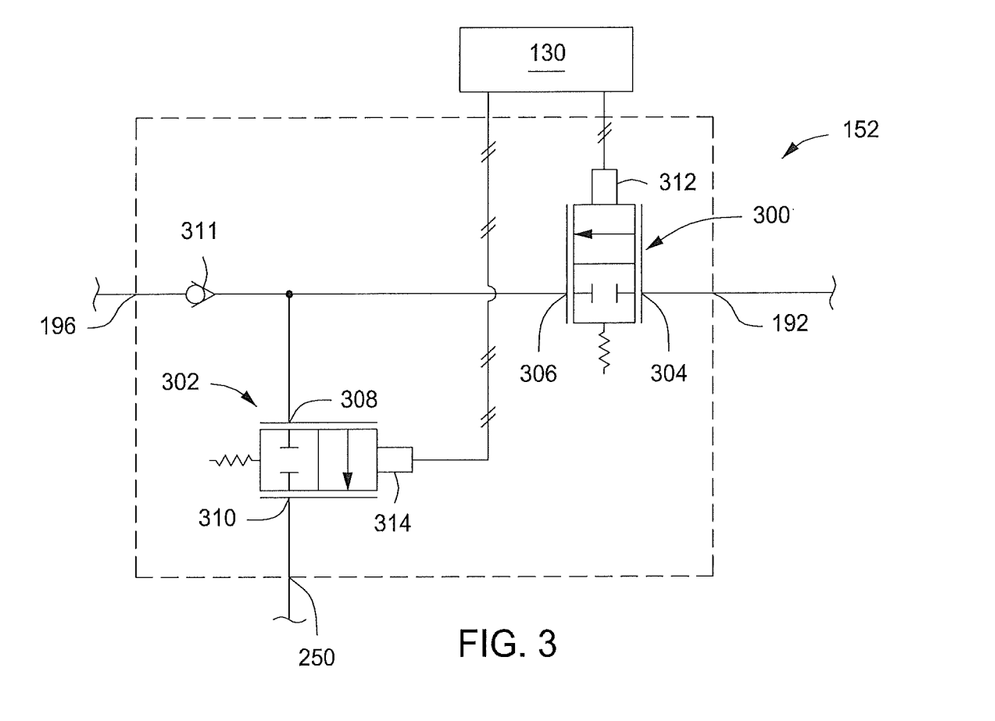
FIG. 3 shows a schematic view of an exhaust valve module, according to an aspect of the disclosure.

FIG. 3 shows a schematic view of an exhaust valve module 152, according to an aspect of the disclosure. The exhaust valve module 152 illustrated in FIG. 3 includes a first valve 300 and a second valve 302. An inlet 304 to the first valve 300 is fluidly coupled to the inlet port 192 of the exhaust valve module 152. An outlet 306 of the first valve 300 is fluidly coupled to the first outlet port 196 of the exhaust valve module 152 and an inlet 308 of the second valve 302. An outlet 310 of the second valve 302 is fluidly coupled to the second outlet port 250 of the exhaust valve module 152.

The exhaust valve module 152 may include a check valve 311 in fluid communication with the outlet 306 of the first valve 300 and the first outlet port 196 of the exhaust valve module 152. The check valve 311 is configured to allow flow only in a flow direction from the first valve 300 toward the first outlet port 196.

The first valve 300 is a two-port, two-position valve, such that a first position of the first valve 300 blocks fluid communication between the inlet 304 and the outlet 306, and a second position of the first valve 300 effects fluid communication between the inlet 304 and the outlet 306. The first valve 300 may include an actuator 312 configured to actuate the first valve 300 between its first position and its second position. The actuator 312 may be a solenoid actuator, a hydraulic actuator, a pneumatic actuator, or any other valve actuator known in the art.

The actuator 312 is operatively coupled to the controller 130 such that the controller may cause the first valve 300 to actuate between its first position and its second position. According to an aspect of the disclosure, the controller 130 is configured to toggle the first valve 300 between its first position and its second position. According to another aspect of the disclosure, the controller 130 is configured to actuate the first valve 300 in a proportional manner through a continuous or substantially continuous spectrum of positions between its first position and its second position, corresponding to a continuous or substantially continuous spectrum of fluid resistances through the first valve 300.

The second valve 302 is a two-port, two-position valve, such that a first position of the second valve 302 blocks fluid communication between the inlet 308 and the outlet 310, and a second position of the second valve 302 effects fluid communication between the inlet 308 and the outlet 310. The second valve 302 may include an actuator 314 configured to actuate the second valve 302 between its first position and its second position. The actuator 314 may be a solenoid actuator, a hydraulic actuator, a pneumatic actuator, or any other valve actuator known in the art.

The actuator 314 is operatively coupled to the controller 130 such that the controller may cause the second valve 302 to actuate between its first position and its second position. According to an aspect of the disclosure, the controller 130 is configured to toggle the second valve 302 between its first position and its second position. According to another aspect of the disclosure, the controller 130 is configured to actuate the second valve 302 in a proportional manner through a continuous or substantially continuous spectrum of positions between its first position and its second position, corresponding to a continuous or substantially continuous spectrum of fluid resistances through the second valve 302.

Figure 4:
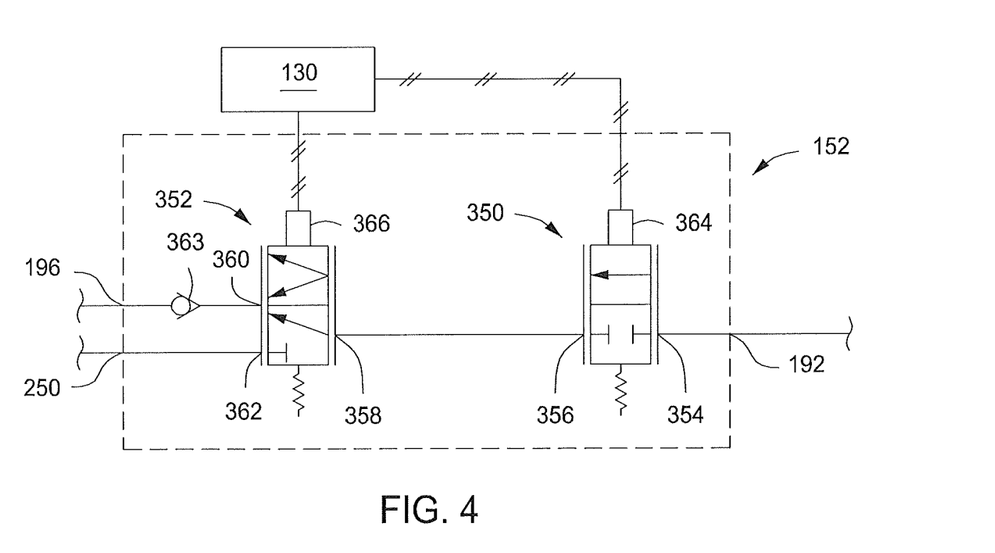
FIG. 4 shows a schematic view of an exhaust valve module, according to an aspect of the disclosure.

FIG. 4 shows a schematic view of an exhaust valve module 152, according to an aspect of the disclosure. The exhaust valve module 152 illustrated in FIG. 4 includes a first valve 350 and a second valve 352. An inlet 354 to the first valve 350 is fluidly coupled to the inlet port 192 of the exhaust valve module 152. An outlet 356 of the first valve 350 is fluidly coupled to an inlet 358 of the second valve 352. A first outlet 360 of the second valve 352 is fluidly coupled to the first outlet port 196 of the exhaust valve module 152, and a second outlet 362 of the second valve 352 is fluidly coupled to the second outlet port 250 of the exhaust valve module 152.

The exhaust valve module 152 may include a check valve 363 in fluid communication with the outlet 356 of the first valve 350 and the first outlet port 196 of the exhaust valve module 152. The check valve 363 is configured to allow flow only in a flow direction from the second valve 352 toward the first outlet port 196.

The first valve 350 is a two-port, two-position valve, such that a first position of the first valve 350 blocks fluid communication between the inlet 354 and the outlet 356, and a second position of the first valve 350 effects fluid communication between the inlet 354 and the outlet 356. The first valve 350 may include an actuator 364 configured to actuate the first valve 350 between its first position and its second position. The actuator 364 may be a solenoid actuator, a hydraulic actuator, a pneumatic actuator, or any other valve actuator known in the art.

The actuator 364 is operatively coupled to the controller 130 such that the controller may cause the first valve 350 to actuate between its first position and its second position. According to an aspect of the disclosure, the controller 130 is configured to toggle the first valve 350 between its first position and its second position. According to another aspect of the disclosure, the controller 130 is configured to actuate the first valve 350 in a proportional manner through a continuous or substantially continuous spectrum of positions between its first position and its second position, corresponding to a continuous or substantially continuous spectrum of fluid resistances through the first valve 350.

The second valve 352 is a three-port, two-position valve, such that a first position of the second valve 352 effects fluid communication between the inlet 358 and the first outlet 360, and blocks fluid communication between the inlet 358 and the second outlet 362, and a second position of the second valve 352 effects fluid communication between the inlet 358 and both the first outlet 360 and the second outlet 362. The second valve 352 may include an actuator 366 configured to actuate the second valve 352 between its first position and its second position. The actuator 366 may be a solenoid actuator, a hydraulic actuator, a pneumatic actuator, or any other valve actuator known in the art.

The actuator 366 is operatively coupled to the controller 130 such that the controller 130 may cause the second valve 352 to actuate between its first position and its second position. According to an aspect of the disclosure, the controller 130 is configured to toggle the second valve 352 between its first position and its second position. According to another aspect of the disclosure, the controller 130 is configured to actuate the second valve 352 in a proportional manner through a continuous or substantially continuous spectrum of positions between its first position and its second position, corresponding to a continuous or substantially continuous spectrum of flow splits between the first outlet 360 and the second outlet 362.

Figure 5:
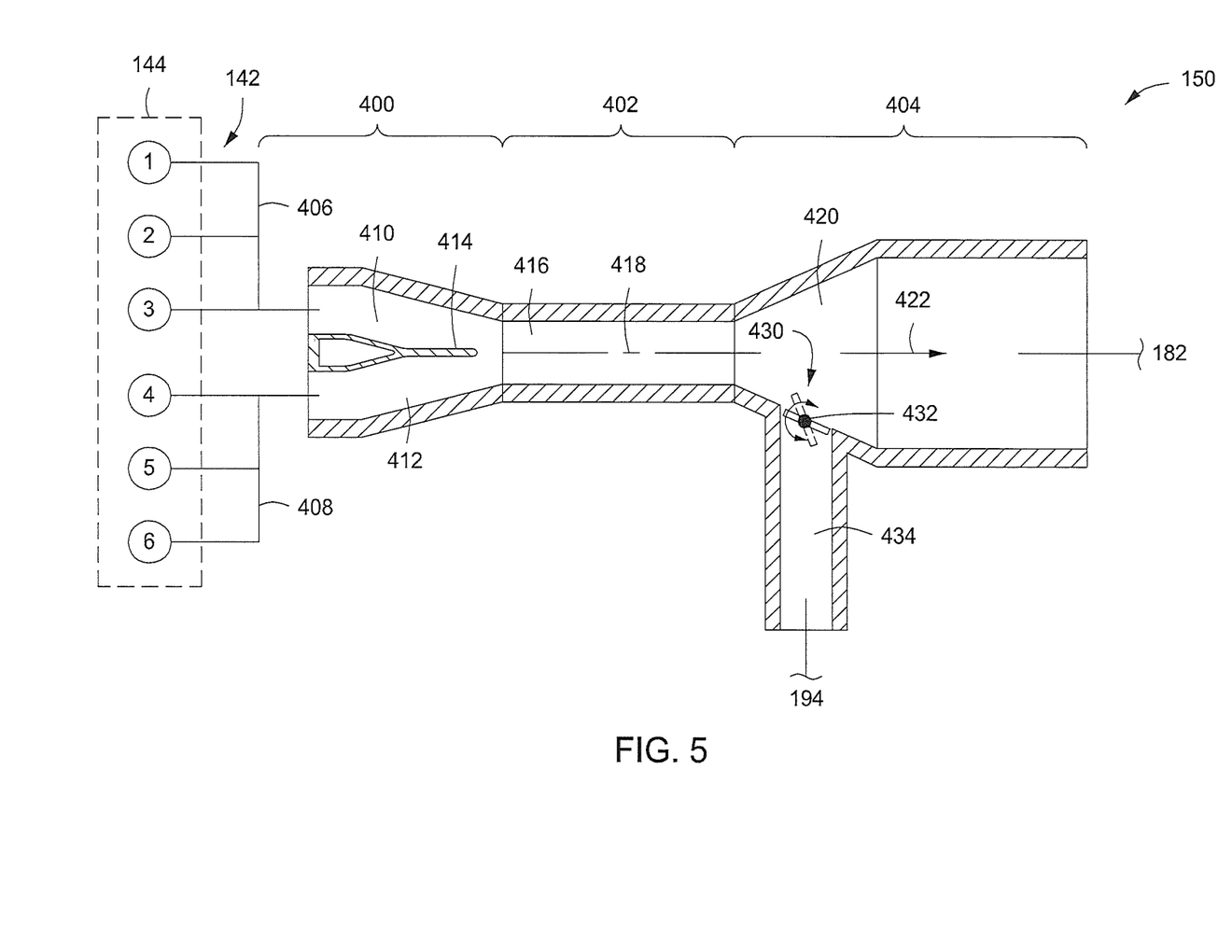
FIG. 5 shows a cross sectional schematic view of an exhaust conduit, according to an aspect of the disclosure.

FIG. 5 shows a cross sectional schematic view of an exhaust conduit 150, according to an aspect of the disclosure. In FIG. 5, the exhaust conduit 150 is an exhaust pulse converting conduit that is tailored for converting kinetic energy in discreet exhaust flow pulses from individual cylinders of the one or more engine cylinders 144 into static pressure energy. The pulse converting conduit 150 shown in FIG. 5 is a non-limiting example of a pulse converter configured for a six-cylinder engine where the one or more engine cylinders 144 consists of six engine cylinders.

The pulse converting conduit 150 includes an ejector section 400, a mixing section 402, and a diffuser section 404. The ejector section 400 includes a first ejector manifold 406, a second ejector manifold 408, a first ejector conduit 410, and a second ejector conduit 412. The first ejector manifold 406 is in fluid communication with individual exhaust runners of the exhaust manifold 142 corresponding to cylinders 1-3, and the second ejector manifold 408 is in fluid communication with individual exhaust runners of the exhaust manifold 142 corresponding to cylinders 4-6.

The ejector section 400 is uniquely designed to receive exhaust flow pulses from exactly three engine cylinders, such that according to the firing order of the cylinders, an exhaust flow pulse from substantially only one engine cylinder at a time flows to either of the ejector conduits 410, 412. It will be appreciated that sequential exhaust pulses entering either of the ejector conduits 410, 412 may partially overlap one another and still result in substantially only one exhaust flow pulse flowing through the corresponding ejector conduit 410, 412 at a time.

According to an aspect of the disclosure, the ejector conduits 410, 412 receive alternating pulses in series from the engine cylinders 144. As a non-limiting example, a cylinder firing order of 1-4-2-5-3-6 results in alternating pulses in series from the engine cylinders 144 into the ejector conduits 410, 412. Although only two ejector manifolds 406, 408 are shown in FIG. 5, it will be appreciated that the ejector section 400 may include any number of ejector manifolds and ejector conduits, such that each ejector manifold and ejector conduit receives exhaust pulses from exactly three engine cylinders. Further, it will be appreciated that although the engine cylinders 144 are schematically represented in-line for FIG. 5, the engine cylinders 144 may assume any spatial arrangement in the IC engine 104, including an in-line configuration or a V-configuration, for example.

The flowpaths of the first ejector conduit 410 and the second ejector conduit 412 may be separated by a septum in the ejector section 400, and then converge into a single mixing conduit 416 in the mixing section 402. The ejector section 400 is configured to preserve kinetic energy of the sequential exhaust pulses from the engine cylinders 144 and convey the exhaust flow pulses to the mixing section 402 with flow momentum substantially aligned with a longitudinal axis 418 of the mixing section 402. Accordingly, sequential pulses from the first ejector conduit 410 and the second ejector conduit 412 may be combined in an alternating fashion as they flow into the mixing conduit 416 of the mixing section 402.

The diffuser section 404 is in fluid communication with an outlet of the mixing section 402, and includes a diverging conduit 420 having a flow area that increases along a bulk flow direction 422. Accordingly, the diverging conduit 420 of the diffuser section 404 is configured to decelerate the exhaust flow therethrough, and in turn convert exhaust flow kinetic energy into static pressure energy.

The diffuser section 404 may include a bypass valve 430 that forms a portion of an inner wall of the diverging conduit. The bypass valve 430 may be a butterfly valve, a gate valve, a globe valve, a ball valve, or any other valve structure known in the art. The bypass valve 430 shown in the non-limiting aspect of FIG. 5 is a butterfly valve that pivots on an axis 432. In a closed position, an outer circumference of the bypass valve may seal against the diverging conduit. In an open position, shown in phantom lines in FIG. 5, the bypass valve 430 and the diverging conduit 420 may define an aperture that effects fluid communication between the diverging conduit 420 and a bypass conduit 434.

According to an aspect of the disclosure, the bypass valve 430 is analogous to the first valve 300 of the exhaust valve module 152 shown in FIG. 3. According to another aspect of the disclosure, the bypass valve 430 is analogous to the first valve 350 of the exhaust valve module 152 shown in FIG. 4. Accordingly, the bypass valve 430 may be actuated by the controller 130 via actuator 312 or the actuator 364 as shown in FIGS. 3 and 4.

The bypass conduit 434 may be fluidly coupled to the exhaust bypass conduit 194 (see FIG. 2), a flowpath internal to the exhaust valve module 152 (see FIG. 2), or the first exhaust valve module outlet conduit 198 (see FIG. 2), for example. The outlet of the diffuser section 404 may be fluidly coupled to the high-pressure turbine inlet conduit 182 (see FIG. 2), for example.

Figure 6:
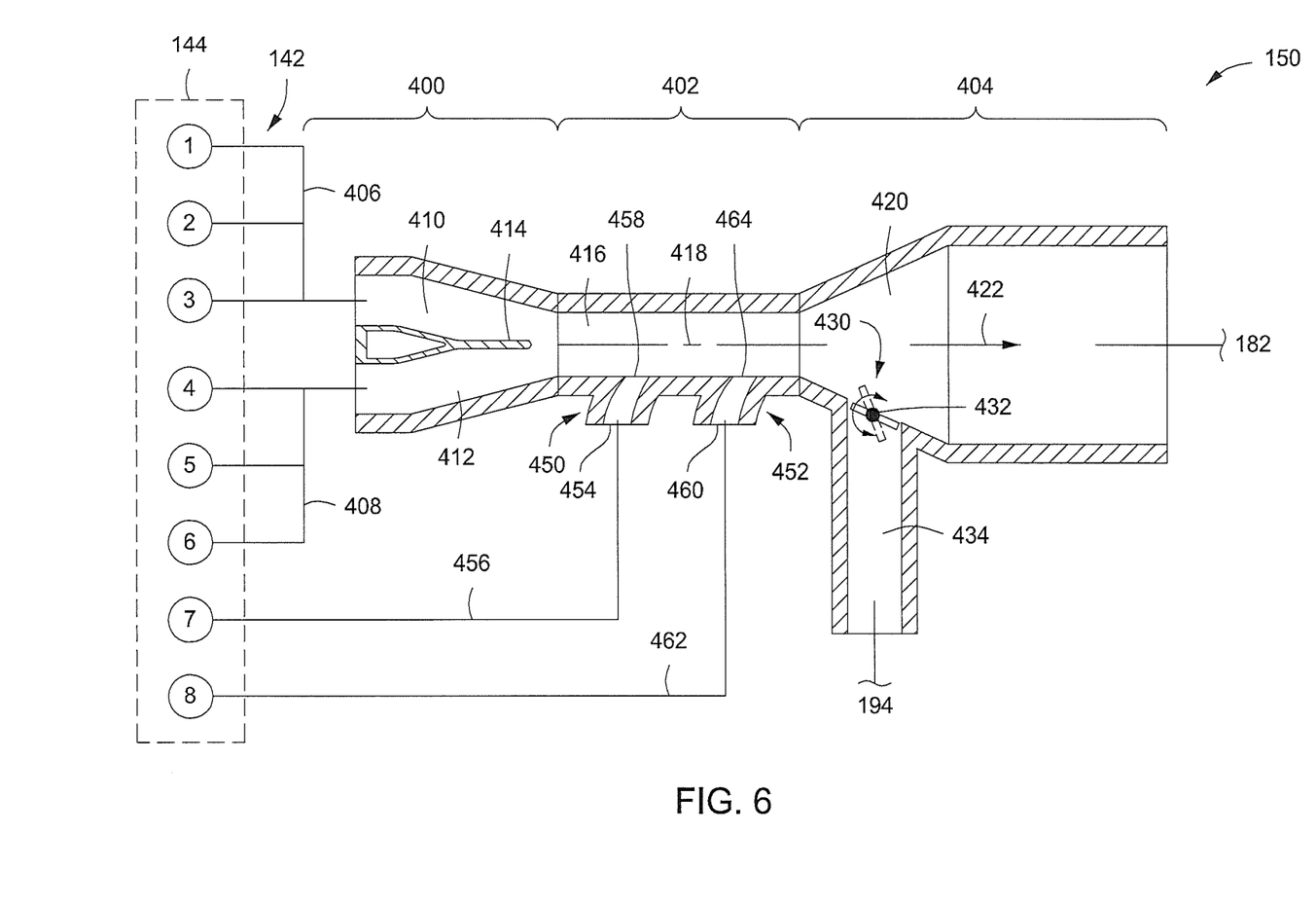
FIG. 6 shows a cross sectional schematic view of an exhaust conduit, according to an aspect of the disclosure.

FIG. 6 shows a cross sectional schematic view of an exhaust conduit 150, according to an aspect of the disclosure. In FIG. 6, the exhaust conduit 150 is an exhaust pulse converting conduit that is tailored for converting kinetic energy in discreet exhaust flow pulses from individual cylinders of the one or more engine cylinders 144 into static pressure energy.

Similar to the exhaust conduit 150 illustrated in FIG. 5, the exhaust conduit 150 illustrated in FIG. 6 includes an ejector section 400, a mixing section 402, and a diffuser section 404. However, the pulse converting conduit 150 shown in FIG. 5 is a non-limiting example of a pulse converter configured for an eight-cylinder engine where the one or more engine cylinders 144 consists of eight engine cylinders.

Here, the number of engine cylinders is not an even multiple of three, and as a result, the remainder engine cylinders, cylinder 7 and cylinder 8, are fluidly coupled to the mixing section 402 instead of the ejector section 400. The mixing section 402 includes a first mixing ejector 450 and a second mixing ejector 452. An inlet 454 of the first mixing ejector 450 is fluidly coupled to the engine cylinder 7 via a conduit 456, and an outlet 458 of the first mixing ejector 450 is fluidly coupled to mixing conduit 416. An inlet 460 of the second mixing ejector 452 is fluidly coupled to the engine cylinder 8 via a conduit 462, and an outlet 464 of the second mixing ejector 452 is fluidly coupled to mixing conduit 416.

The mixing section 402, illustrated in FIG. 6, is configured to preserve kinetic energy of the sequential exhaust pulses from cylinder 7 and cylinder 8 of the engine cylinders 144 and convey the exhaust flow pulses to the mixing conduit 416 with flow momentum having a component along the longitudinal axis 418 of the mixing section 402. Accordingly, exhaust pulses from engine cylinder 7 and engine cylinder 8 may be combined with exhaust pulses from the first ejector conduit 410 and the second ejector conduit 412 as they flow through the mixing conduit 416 of the mixing section 402. According to an aspect of the disclosure, not less than 50% of the flow momentum of exhaust pulses delivered to the mixing conduit 416 via the first mixing ejector 450, the second mixing ejector 452, or both, is a momentum component aligned with the longitudinal axis 418.

Although specifically eight engine cylinders are illustrated in FIG. 6, it will be appreciated that the present disclosure may be applied to any number of engine cylinders having either one or two remaining cylinders above the number of cylinders that are an even multiple of three.

According to an aspect of the disclosure, a flow area of the inlet 454 to the first mixing ejector 450 is substantially the same as a flow area of the outlet 458 from the first mixing ejector 450. According to another aspect of the disclosure, a flow area of the inlet 454 to the first mixing ejector 450 is within 5% of a flow area of the outlet 458 from the first mixing ejector 450. According to yet another aspect of the disclosure, a flow area of the inlet 454 to the first mixing ejector 450 is within 2% of a flow area of the outlet 458 from the first mixing ejector 450.

According to an aspect of the disclosure, a flow area of the inlet 460 to the second mixing ejector 452 is substantially the same as a flow area of the outlet 464 from the second mixing ejector 452. According to another aspect of the disclosure, a flow area of the inlet 460 to the second mixing ejector 452 is within 5% of a flow area of the outlet 464 from the second mixing ejector 452. According to yet another aspect of the disclosure, a flow area of the inlet 460 to the second mixing ejector 452 is within 2% of a flow area of the outlet 464 from the second mixing ejector 452.

The controller 130 may be any purpose-built processor for effecting control of the exhaust system 106. It will be appreciated that the controller 130 may be embodied in a single housing, or a plurality of housings distributed throughout the engine 104 or the exhaust system 106. Further, the controller 130 may include power electronics, preprogrammed logic circuits, data processing circuits, volatile memory, non-volatile memory, software, firmware, combinations thereof, or any other controller structures known in the art.

INDUSTRIAL APPLICABILITY

The present disclosure is applicable engine exhaust systems and, more particularly, to exhaust gas recirculation systems including more than one turbocharger.

Driving an EGR flow in an engine system may consume shaft power from the engine that could otherwise be used to perform work on a load, or reduce the shaft power output from an engine through increased engine exhaust backpressure, for example. In turn, the power consumption for an EGR system may decrease the overall thermal efficiency for an engine system. Therefore, minimizing the consumption or displacement of shaft power to drive an EGR flow is desired. The power consumption to drive an EGR flow may be reduced by reducing the flow resistance or pressure drop characteristic of the EGR circuit, selectively tailoring the pressure potential for driving the EGR flow without undue throttling of the EGR flow, or combinations thereof.

The maximum amount of pressure potential to drive an EGR flow may vary with engine speed, engine load, or combinations thereof. Therefore, exhaust systems are desired that can provide the full amount of EGR flow desired across the full engine operating space.

The rotating inertia of turbochargers in an exhaust system may limit engine responsiveness because of the time and power required to accelerate the rotating components of the turbocharger. Accordingly, low rotating inertia of turbochargers is desired during acceleration events.

Fluid-mechanical limits of turbocharger operation, for example due to surge/stall or choking, may limit engine operability. Accordingly, some conventional systems include variable turbine inlet geometries to better maintain margin on the fluid-mechanical limits. However, variable turbine inlet geometries may be expensive, complex, large in size, or combinations thereof.

Referring to FIG. 2, the exhaust system 106 takes advantage of the two-turbocharger arrangement, including the high-pressure compressor 162 in series flow arrangement with the low-pressure compressor 170, to introduce EGR flow downstream of the low-pressure compressor 170 but upstream of the high-pressure compressor 162. As a result, the driving pressure potential across the EGR conduit 252 is higher than if the EGR flow were introduced downstream of the high-pressure compressor. Further, the EGR flow is only compressed by the high-pressure compressor 162, and not the low-pressure compressor 170, thereby decreasing the amount of shaft work extracted by the turbochargers from the exhaust flow compared to conventional systems that introduce EGR flow at the inlet of the first or lowest-pressure compressor stage.

The exhaust valve module 152 enables control over the allocation of exhaust flow between the high-pressure turbine 160 and the low-pressure turbine 168. For example, by tailoring the flow restriction between the inlet port 192 and the first outlet port 196 of the exhaust valve module 152, the exhaust system 106 may selectively bypass a controlled amount of exhaust flow around the high-pressure turbine 160, and then selectively divert the bypassed exhaust flow to either the low-pressure turbine 168 or the EGR conduit 252.

Figure 7:
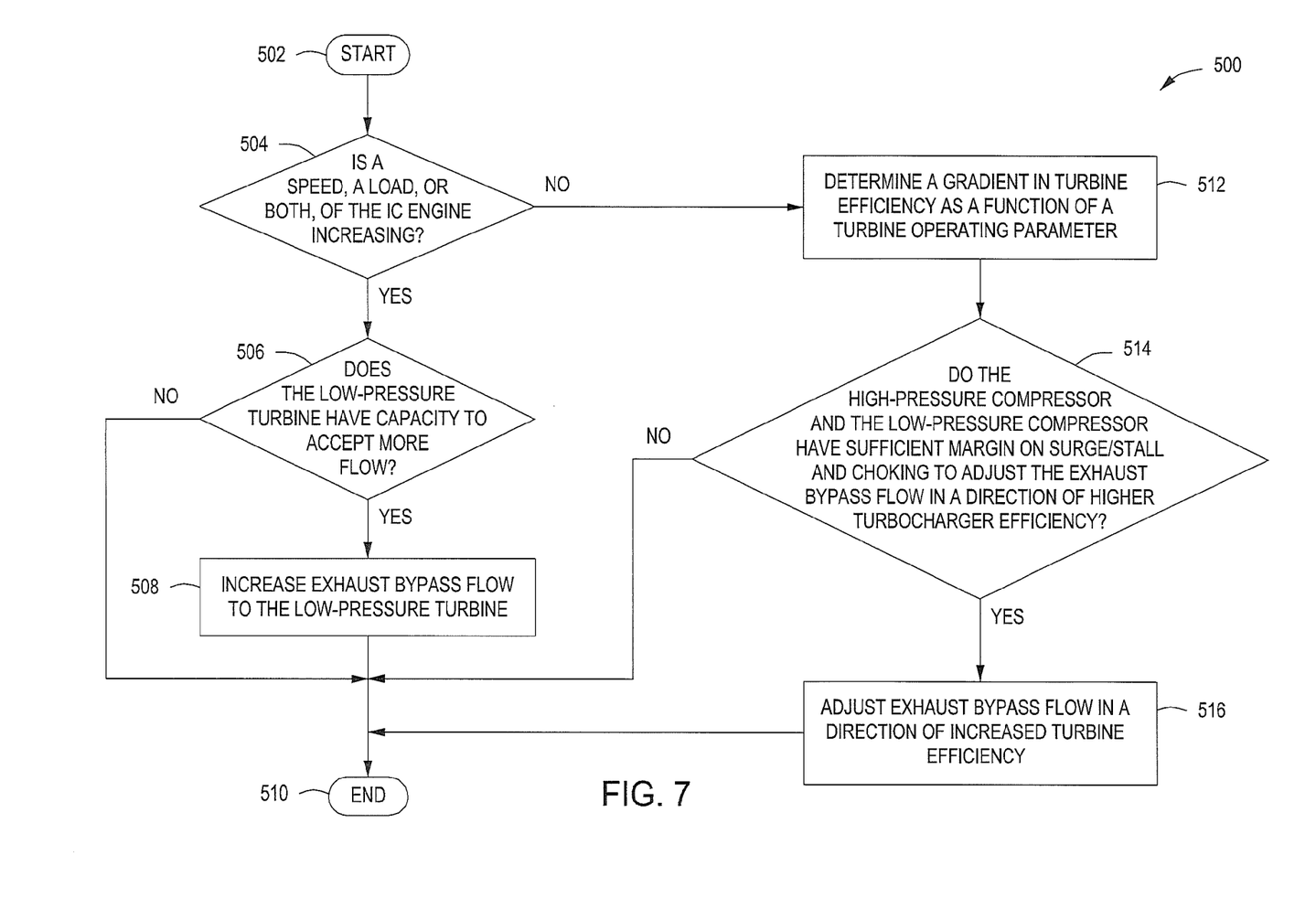
FIG. 7 is a flowchart of a method for operating an exhaust system, according to an aspect of the disclosure.

FIG. 7 is a flowchart of a method 500 for operating an exhaust system 106, according to an aspect of the disclosure. After advancing from the start in step 502, in step 504 the method 500 determines whether the speed of the IC engine 104, the load of the IC engine 104, or both, is increasing. The controller 130 may monitor engine speed via an engine speed sensor, for example, and may monitor engine load according to measurements or estimates of fuel flow, air flow, engine speed, or combinations thereof, for example, and be further configured to evaluate temporal gradients in engine speed, engine load, or both.

If the controller 130 determines that the engine is experiencing a transient of increasing speed or load, then the method 500 proceeds to step 506 to determine whether the low-pressure turbine 168 has capacity to receive more exhaust flow. The controller 130 may determine capacity of the low-pressure turbine 168 to receive additional exhaust flow based on measurements or estimates of a rotational speed of the low-pressure turbine 168, a flow of exhaust through the low-pressure turbine 168, a pressure ratio across the low-pressure turbine 168, or combinations thereof, and comparison of one or more of these operating parameters of the low-pressure turbine 168 to one or more threshold values.

If the low-pressure turbine 168 has capacity to receive additional exhaust flow, then the method 500 proceeds to step 508, where the exhaust bypass flow to the low-pressure turbine 168 is increased. The controller 130 may increase the exhaust bypass flow to the low-pressure turbine 168 by decreasing the flow resistance, or increases the effective flow area, between the inlet port 192 and the first outlet port 196 of the exhaust valve module 152. According to an aspect of the disclosure, the controller 130 may actuate the exhaust valve module 152 to bypass substantially all of the exhaust flow away from the high-pressure turbine 160 to the low-pressure turbine 168. It will be appreciated that according to the aspect illustrated in FIG. 2, that the exhaust valve module 152 may bypass substantially all of the exhaust flow around the high-pressure turbine 160 without blocking fluid communication between the exhaust manifold 142 and the high-pressure turbine 160.

By bypassing exhaust flow around the high-pressure turbine 160, the exhaust system 106 may extract most of the turbocharging work from a single turbocharger, namely the low-pressure turbocharger 156, thereby performing more turbocharging work with an effectively smaller rotating inertia of just the low-pressure turbocharger 156. The lower net effective rotating inertia of the overall turbocharging system may result in improved responsiveness of the IC engine 104 during the transient increase in speed or load by avoiding the time and energy required to fully accelerate both the low-pressure turbocharger 156 and the high-pressure turbocharger 154.

According to an aspect of the disclosure, the low-pressure turbocharger 156 has substantially the same rotating inertia as the high-pressure turbocharger 154. According to another aspect of the disclosure, the low-pressure turbocharger 156 has a smaller rotating inertia than the high-pressure turbocharger 154.

If the low-pressure turbine 168 does not have sufficient capacity to receive an increase in exhaust bypass flow at step 506, then the method 500 proceeds to the end at step 510.

If the IC engine 104 is not increasing in speed or load in step 504, then the method 500 proceeds to step 512, where a gradient in turbocharger efficiency at the current operating point is determined as a function of a turbine operating parameter. Here, the efficiency could be for the low-pressure turbine 168, the high-pressure turbine 160, or a system including both. The turbine operating parameter could include turbine speed, turbine flow, turbine pressure ratio, turbine inlet temperature, turbine outlet temperature, combinations thereof, or any other parameter known to affect turbine efficiency. Accordingly, based on the gradient in turbine efficiency determined in step 512, the controller 130 may determine whether increasing or decreasing the exhaust bypass flow to the low-pressure turbine 168 would urge the relevant turbine efficiency higher.

According to an aspect of the disclosure, the gradient in turbine efficiency could be determined with respect to turbine flow at a constant speed. According to another aspect of the disclosure, the gradient in turbine efficiency may be determined with respect to a plurality of turbine operating parameters, and the gradient may be in a direction of steepest ascent in turbine efficiency with respect to the corresponding parameter space. According to another aspect of the disclosure, the gradient in turbine efficiency could be determined with respect to both turbine speed and turbine flow, and the gradient could be in a direction of steepest ascent in turbine efficiency with respect to turbine speed and turbine flow. However, it will be appreciated that persons having skill in the art may develop other gradient determination schemes based on any number of turbine operating parameters.

Next, in step 514, the method 500 determines whether the high-pressure compressor 162, the low-pressure compressor 170, or combinations thereof, have sufficient operating margin on surge/stall and choking to adjust the exhaust bypass flow in a direction of higher turbine efficiency. The margin determination could be based on a compressor model map stored in the controller 130, physical models of the compressors stored in the controller 130, measurements of current compressor operating conditions, combinations thereof, or any other parameters known in the art to be relevant to determining surge/stall margin or choking margin for a compressor.

If sufficient margin does not exist to adjust the exhaust bypass flow in a direction of higher turbine efficiency, then the method 500 proceeds to step 510.

If sufficient margin exists to adjust the exhaust bypass flow in a direction of higher turbine efficiency, then the method 500 proceeds to step 516, where the exhaust bypass flow is adjusted in a direction of increased turbine efficiency. The magnitude of the step could be based on an operating map established through lab testing; a prescribed fixed step magnitude in exhaust bypass flow adjustment; a physical model of the exhaust system 106; a step magnitude based on a current operating margin for the high-pressure compressor 162, the low-pressure compressor 170, or both; or any other method known in the art for determining a flow adjustment magnitude.

Referring to FIGS. 5 and 6, the symmetric ejector manifolds 406, 408 promote engine power output by better preserving exhaust kinetic energy and converting exhaust kinetic energy into static pressure. Further, the pulse converting conduit 150 may also promote high-pressure turbine 160 inlet flow steadiness.

The bypass valve 430 may be advantageously located in the diffuser section 404, and according to an aspect of the disclosure, a portion of the bypass valve 430 may compose at least a portion of the diverging conduit 420. In turn, the inlet to the bypass valve 430 may draw upon exhaust flow at a higher static pressure after conversion of kinetic energy into static pressure. Further, operation of the bypass valve 430 may improve performance of the diffuser section 404 by bleeding off a portion of the boundary layer near the wall, thereby adding margin against flow separation in the diffuser section 404.

Any of the methods or functions described herein may be performed by or controlled by the controller 130. Further, any of the methods or functions described herein may be embodied in a computer-readable non-transitory medium for causing the controller 130 to perform the methods or functions described herein. Such computer-readable non-transitory media may include magnetic disks, optical discs, solid state disk drives, combinations thereof, or any other computer-readable non-transitory medium known in the art. Moreover, it will be appreciated that the methods and functions described herein may be incorporated into larger control schemes for an engine, a machine, or combinations thereof, including other methods and functions not described herein.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Unless specified otherwise, the terms "substantial" or "substantially" as used herein mean considerable in extent, or largely but not necessarily wholly that which is specified.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

We claim:

1. An exhaust system, comprising:
an exhaust conduit configured to receive a flow of exhaust gas from an internal combustion engine;
a valve assembly disposed in an exhaust bypass conduit and having an inlet port, a first outlet port, and a second outlet port, the inlet port of the valve assembly being in fluid communication with the exhaust conduit via the exhaust bypass conduit;
wherein the valve assembly has a first configuration that blocks fluid communication between the inlet port and the first outlet port; and
wherein the valve assembly has a second configuration that effects fluid communication between the inlet port and the first outlet port;
a first turbine having an inlet that is fluidly coupled to the exhaust conduit via a first turbine inlet conduit, the first turbine inlet conduit extending from the exhaust conduit to the inlet of the first turbine;
a first compressor operatively coupled to the first turbine via a first shaft;
a second turbine having an inlet that is fluidly coupled to the first outlet port of the valve assembly via a first outlet port conduit, and fluidly coupled to an outlet of the first turbine via a first turbine outlet conduit, the first turbine outlet conduit being distinct from the first outlet port conduit; and
a controller operatively coupled to the valve assembly, the controller being configured to effect simultaneous fluid communication between the inlet of the second turbine and the outlet of the first turbine via the first turbine outlet conduit, and between the inlet of the second turbine and the first outlet port of the valve assembly via the first outlet port conduit, by actuating the valve assembly to the second configuration.

2. The exhaust system of claim 1, further comprising:
a second compressor operatively coupled to the second turbine, an outlet of the second compressor being fluidly coupled to an inlet of the first compressor via a first compressor inlet conduit; and
an exhaust gas recirculation (EGR) conduit effecting fluid communication between the second outlet port of the valve assembly and the first compressor inlet conduit.

3. The exhaust system of claim 2, wherein the first configuration of the valve assembly blocks fluid communication between the inlet port of the valve assembly and the second outlet port of the valve assembly.

4. The exhaust system of claim 3, wherein the second configuration of the valve assembly blocks fluid communication between the inlet port of the valve assembly and the second outlet port of the valve assembly.

5. The exhaust system of claim 3, wherein the second configuration of the valve assembly effects fluid communication between the inlet port of the valve assembly and the second outlet port of the valve assembly.

6. The exhaust system of claim 2,
wherein the valve assembly has a third configuration that effects fluid communication between the inlet port and the first outlet port;
wherein the second configuration of the valve assembly effects a first flow resistance between the inlet port and the first outlet port of the valve assembly;
wherein the third configuration of the valve assembly effects a second flow resistance between the inlet port and the first outlet port of the valve assembly; and
wherein the first flow resistance is different from the second flow resistance.

7. The exhaust system of claim 6, wherein the controller is further configured to adjust a flow split between an exhaust gas flow through the first turbine and an exhaust gas flow through the second turbine by actuating the valve assembly between the second configuration and the third configuration, the exhaust gas flow through the first turbine and the exhaust gas flow through the second turbine each being greater than zero.

8. The exhaust system of claim 2,
wherein the valve assembly includes a bypass valve and an EGR valve;
wherein the inlet port of the valve assembly is an inlet port of the bypass valve;
wherein an outlet port of the bypass valve is fluidly coupled to an inlet of the EGR valve via an EGR valve conduit; and
wherein the bypass valve is operable between a first configuration that blocks fluid communication between the inlet port of the bypass valve and the EGR valve conduit, and a second configuration that effects fluid communication between the inlet port of the bypass valve and the EGR valve conduit.

9. The exhaust system of claim 1, wherein the controller is further configured to block fluid communication between the exhaust conduit and the inlet to the second turbine via the valve assembly by actuating the valve assembly to the first configuration.

10. An internal combustion engine, comprising:
a plurality of engine cylinders, each engine cylinder of the plurality of engine cylinders including a piston configured to reciprocate therein;
an intake manifold fluidly coupled to the plurality of engine cylinders via a plurality of intake valves;
an exhaust manifold fluidly coupled to the plurality of engine cylinders via a plurality of exhaust valves;
a valve assembly disposed in an exhaust bypass conduit and having an inlet port, a first outlet port, and a second outlet port, the inlet port of the valve assembly being in fluid communication with the exhaust manifold via the exhaust bypass conduit;
wherein the valve assembly has a first configuration that blocks fluid communication between the inlet port and the first outlet port; and
wherein the valve assembly has a second configuration that effects fluid communication between the inlet port and the first outlet port;
a first turbine having an inlet that is fluidly coupled to the exhaust manifold via a first turbine inlet conduit, the first turbine inlet conduit extending from the exhaust manifold to the inlet of the first turbine;
a first compressor operatively coupled to the first turbine, an outlet of the first compressor being fluidly coupled to the intake manifold;
a second turbine having an inlet that is fluidly coupled to the first outlet port of the valve assembly via a first outlet port conduit, and fluidly coupled to an outlet of the first turbine via a first turbine outlet conduit, the first turbine outlet conduit being distinct from the first outlet port conduit; and a controller operatively coupled to the valve assembly, the controller being configured to effect simultaneous fluid communication between the inlet of the second turbine and the outlet of the first turbine via the first turbine outlet conduit, and between the inlet of the second turbine and the first outlet port of the valve assembly via the first outlet port conduit, by actuating the valve assembly to the second configuration.

11. The internal combustion engine of claim 10, wherein the exhaust manifold includes an exhaust pulse converter.

12. The internal combustion engine of claim 11,
wherein the inlet port of the valve assembly is fluidly coupled to a diffuser of the exhaust pulse converter; and
wherein an outlet of the diffuser of the exhaust pulse converter is fluidly coupled to the inlet of the first turbine.

13. The internal combustion engine of claim 11,
wherein the exhaust pulse converter includes a first ejector conduit and a second ejector conduit;
wherein the plurality of engine cylinders includes a first engine cylinder, a second engine cylinder, a third engine cylinder, a fourth engine cylinder, a fifth engine cylinder, and a sixth engine cylinder;
wherein the first engine cylinder, the second engine cylinder, and the third engine cylinder are fluidly combined and coupled to the first ejector conduit via a first ejector manifold; and
wherein the fourth engine cylinder, the fifth engine cylinder, and the sixth engine cylinder are fluidly combined and coupled to the second ejector conduit via a second ejector manifold.

14. The internal combustion engine of claim 13,
wherein the exhaust pulse converter further includes a mixing section disposed downstream of the first ejector conduit and the second ejector conduit, the mixing section being fluidly coupled to both the first ejector conduit and the second ejector conduit;
wherein the plurality of engine cylinders further includes a seventh engine cylinder and a eighth engine cylinder;
wherein the seventh engine cylinder is fluidly coupled to the mixing section via a first mixing ejector; and
wherein the eighth engine cylinder is fluidly coupled to the mixing section via a second mixing ejector.

15. A method for operating an internal combustion engine, the internal combustion engine including an exhaust conduit fluidly coupled to the internal combustion engine, and a valve assembly disposed in an exhaust bypass conduit and having an inlet port, a first outlet port, and a second outlet port, the inlet port of the valve assembly being in fluid communication with the exhaust conduit via the exhaust bypass conduit, wherein the valve assembly has a first configuration that blocks fluid communication between the inlet port and the first outlet port, and a second configuration that effects fluid communication between the inlet port and the first outlet port,
the method comprising:
generating a flow of exhaust gas via the internal combustion engine;
receiving the flow of exhaust gas in the exhaust conduit;
selectively splitting the flow of exhaust gas into a first exhaust gas flow and a second exhaust gas flow;
directing the first exhaust gas flow through a first turbine via a first turbine inlet conduit;
directing the second exhaust gas flow to the inlet port of the valve assembly via the exhaust bypass conduit;
delivering at least a portion of the second exhaust gas flow to the first outlet port of the valve assembly;
combining the first exhaust gas flow and the at least a portion of the second exhaust gas flow into a third exhaust gas flow downstream of the first turbine; and
directing the third exhaust gas flow through a second turbine.

16. The method of claim 15, further comprising:
selectively splitting the second exhaust flow into a fourth exhaust flow and a fifth exhaust flow via the valve assembly;
directing the fourth exhaust flow through the second turbine via the first outlet port of the valve assembly; and
directing the fifth exhaust flow to an inlet of a first compressor via the second outlet port of the valve assembly, the first compressor being operatively coupled to the first turbine via a first shaft.

17. The method of claim 15, further comprising:
determining, via a controller, whether one of a load and a speed of the internal combustion engine is increasing; and
increasing a proportion of the second exhaust gas flow relative to the first exhaust gas flow via the valve assembly based on whether the load or the speed of the internal combustion engine is increasing.

18. The method of claim 15, further comprising:
determining, via a controller, a gradient in turbine efficiency as a function of one or more turbine operating parameters; and
adjusting a relative proportion of the second exhaust gas flow to the first exhaust gas flow via the valve assembly based on the gradient in turbine efficiency.

19. The method of claim 15, further comprising:
comparing, via a controller, a current speed and load of the internal combustion engine to a reference speed and load of the internal combustion engine;
wherein the selectively splitting the flow of exhaust gas into a first exhaust gas flow and a second exhaust gas flow is based on the comparing the current speed and load of the internal combustion engine to the reference speed and load of the internal combustion engine.

20. The method of claim 19, further comprising selectively delivering all of the flow of exhaust gas through the first turbine via control of the valve assembly and based on the comparing the current speed and load of the internal combustion engine to the reference speed and load of the internal combustion engine.

* * * * *